United States Patent

[11] 3,588,652

| | | | |
|---|---|---|---|
| [72] | Inventor | Robin B. Lewis |  |
|  |  | Hardwick, Mass. |  |
| [21] | Appl. No. | 863,835 |  |
| [22] | Filed | Oct. 6, 1969 |  |
| [45] | Patented | June 28, 1971 |  |
| [73] | Assignee | Jamesbury Corporation |  |
|  |  | Worcester, Mass. |  |

[54] FAIL SAFE MECHANISM FOR REVERSIBLE MOTORS
11 Claims, 1 Drawing Fig.

[52] U.S. Cl. .................................................. 318/282,
318/286, 318/563
[51] Int. Cl. .................................................. G05b 9/02
[50] Field of Search .......................................... 318/563,
282, 286, 293, 626, 627

[56] References Cited
UNITED STATES PATENTS

| | | | |
|---|---|---|---|
| 2,913,651 | 11/1959 | Smith et al. ................ | 318/282 |
| 3,293,521 | 12/1966 | Vroonhoven ................ | 318/282X |

*Primary Examiner*—Benjamin Dobeck
*Attorney*—Shaffert and Miller

ABSTRACT: An electric fail safe device for a valve actuator comprising a reversible motor wherein the application of electric current to drive the reversible motor from its "safe" position energizes a relay and charges a capacitor. Upon failure of the power supply, the relay is deenergized and the energy stored in the capacitor is used to drive the reversible motor to return the valve to its "safe" position. Limit switches are provided to disconnect the motor from the driving circuitry whenever the motor has completely opened or completely closed the valve.

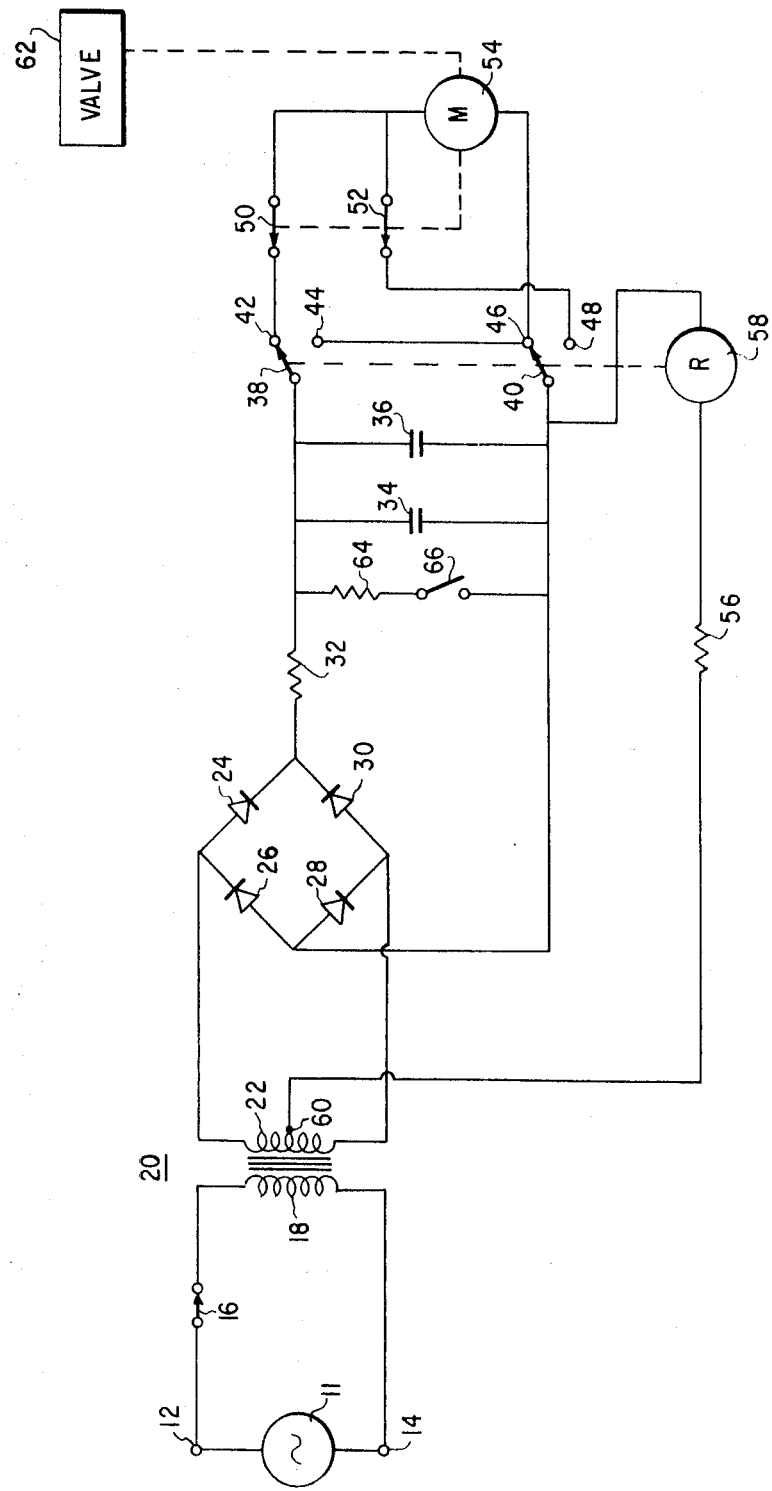
INVENTOR
ROBIN B. LEWIS

FAIL SAFE MECHANISM FOR REVERSIBLE MOTORS

The invention of the present application relates to a fail safe mechanism. More particularly, the present invention relates to an electric fail safe mechanism for returning a valve to its "safe" position upon a failure of the power supply.

The failure of a valve actuator due to loss of power can result in disastrous consequences. For example, the failure of a valve in its closed position controlling a fire fighting water line could cause great loss. Similarly, the failure of a valve in its open position located at the bottom of a tank could cause considerable damage. Therefore, it is desirable that certain valve actuators be so designed as to fail in a "safe" position. Thus, even though loss of power prevents the proper functioning of the valve actuator, disastrous consequences may be prevented.

Accordingly, it is an object of the present invention to provide a fail safe mechanism for a valve.

It is a further object of the present invention to provide a valve actuating mechanism that will return the valve to a "safe" position upon the failure of the power supply.

It is yet another object of the present invention to provide storage capacitor means which may be charged while the power supply is in operation and which will discharge to return the valve to a "safe" position upon the failure of the power supply.

It is a further object of the present invention to provide switching circuitry for reversing the direction of movement of a reversible motor upon the failure of the power supply in order to return the valve to a "safe" position.

It is yet another object of the present invention to provide a means for converting alternating current to direct current in order to drive a reversible motor valve actuator.

Other objects will appear hereinafter.

In accordance with the present invention, an electric fail safe driving mechanism for a valve is provided. Capacitor storage means are positioned between the source of power and the valve actuator in such a manner that the driving of the valve actuator causes the storage of energy within the capacitor storage means. The application of electrical current to the valve actuator also causes the energization of a relay which maintains switching means in predetermined positions. Failure of the power supply causes the deenergization of the relay which reverses the polarity of the terminal connections to the valve actuator. Thus, the energy stored within the capacitor storage means discharges into the valve actuator driving the valve to a "safe" position.

For the purpose of illustrating the invention, there is shown in the drawings a form which is presently preferred, it being understood, however, that the invention is not limited to the precise arrangements and instrumentalities shown.

Referring more particularly to the drawings, the fail safe mechanism circuitry of the present invention is generally designated as 10 in the FIGURE.

Power to drive the valve actuator circuitry of the present invention is provided at input terminals 12 and 14 by power source 11. As shown in the FIGURE, power source 11 supplies 115 volts at 60 cycles per second. Alternatively, a power supply of 230 volts is contemplated. However, it is noted that the present invention is not restricted to a particular power source. The input power supplied to terminals 12 and 14 by power source 11 is coupled to primary winding 18 of transformer 20 by control switch 16. Under well-known magnetic principles, electrical energy is transmitted from primary winding 18 to secondary winding 22 by transformer action.

Secondary winding 22 is coupled to a conventional full wave bridge network comprised of diodes 24, 26, 28 and 30. Diodes 24 and 28 permit current flow in one direction during one half of the power cycle while diodes 26 and 30 permit current flow in the same direction during the other half of the power cycle. Thus, diodes 24, 26, 28 and 30 perform the function of a rectifier unit.

The rectified current flowing through the bridge network is connected to parallely arranged storage capacitors 34 and 36 by surge-limiting resistor 32 which protects the bridge network from capacitor charging surges. Although two storage capacitors are shown in the FIGURE, it is to be understood that one or any number of capacitor storage elements may be utilized within the scope of the present invention.

Resistor 64 and control switch 66 are disposed in a path parallel to storage capacitors 34 and 36. Thus, if desired, the charge on storage capacitors 34 and 36 may be discharged by the closing of control switch 66.

The output of storage capacitors 34 and 36 is connected to switches 38 and 40. Switches 38 and 40 are shown in the FIGURE in the deenergized position. Switch 38 may be disposed in contact with terminal 42 or terminal 44. In like manner, switch 40 may be disposed in contact with terminal 46 or terminal 48.

Switches 38 and 40, terminals 44 and 48 and limit switch 52 provide a connection between power source 11 and motor 54. In like manner, switches 38 and 40, terminals 42 and 46 and limit switch 50 provide a connection between storage capacitors 34 and 36 and motor 54 when there is a loss of power.

Motor 54 is utilized to control the position of valve 62 by any appropriate means (not specifically shown in the FIGURE but represented as a dotted line). In the preferred embodiment, motor 54 may take the form of a reversible motor capable of driving valve 62 to its open or closed position. In this regard, once motor 54 has driven valve 62 to either its open or closed position, it is desirable that motor 54 be deactuated. Thus, limit switch 52 disconnects the power from motor 54 when valve 62 is disposed in one of its extreme positions. In the FIGURE, a dotted line has been shown to represent the sensing control between motor 54 and limit switch 52. In like manner, limit switch 50 disconnects motor 54 from the energy stored within storage capacitors 34 and 36.

Secondary winding 22 is center tapped at junction 60 thereby connecting resistor 56 and relay 58 to the power source. If it were desired to apply additional voltage to relay 58, junction 60 could be positioned to span the entire length of secondary winding 22. Relay 58 controls the movement of switches 38 and 40 (as indicated by dotted lines in the FIGURE) by conventional magnetic principles. In this regard, it is particularly noted that it is well within the scope of the present invention to replace relay 58 with solid state circuitry.

As long as relay 58 is energized, switch 38 will be disposed in contact with terminal 44 and switch 40 will be disposed in contact with terminal 48. The deenergization of relay 58 causes the simultaneous movement of switches 38 and 40. Thus, switch 38 will be moved out of contact with terminal 44 and into contact with terminal 42. In like manner, switch 40 will be moved out of contact with terminal 48 and into contact with terminal 46. Thus, relay 58 will be energized as long as power is applied to primary winding 18 thereby maintaining switches 38 and 40 in contact with terminals 44 and 48. If there is a power failure, relay 58 will be deenergized causing switches 38 and 40 to make contact with terminals 42 and 46 respectively.

The operation of the fail safe mechanism of the present invention is as follows. Control switch 16 is placed in its closed position in order to connect power source 11 to primary winding 18 of transformer 20. The energy from power source 11 is transferred from primary winding 18 to secondary winding 22 by transformer action. The alternating current in secondary winding 22 is converted to direct current by diodes 24, 26, 28 and 30 which collectively function as a rectifier unit. The direct current charges storage capacitors 34 and 36 through surge limiting resistor 32.

A portion of the alternating voltage within secondary winding 22 is connected to relay 58 through resistor 56. Energization of relay 58 causes switches 38 and 40 to make contact with terminals 44 and 48 respectively. Thus, a direct current of predetermined polarity is applied to motor 54 through limit switch 52. This causes valve 62 to be moved to one of its extreme positions. When valve 62 reaches this position, limit switch 52 is opened (by means not shown) in order to prevent the continuous driving of motor 54 by power source 11.

If, for any reason, power source 11 should fail, no voltage would be applied to primary winding 18. Accordingly, no voltage would be generated in secondary winding 22. This cessation of current in secondary winding 22 deenergizes relay 58. The deenergization of relay 58 causes switches 38 and 40 to make contact with terminals 42 and 46 respectively. This, in effect, reverses the polarity of current applied to motor 54 thereby driving motor 54 in a opposite direction.

In the event of a power failure, it is desirable that valve 62 be returned to a "safe" position. This is accomplished by driving motor 54 in a reverse direction whenever power source 11 fails. In the circuitry of the present invention, the energy stored within storage capacitors 34 and 36 provides the power to drive motor 54 to return valve 62 to a "safe" position upon failure of power source 11. The deenergization of relay 58 caused by the failure of power source 11 causes the simultaneous movement of switches 38 and 40 causing the reversal of the polarity of the current to motor 54. Therefore, valve 62 will always be returned to a "safe" position upon the failure of power source 11.

The present invention may be embodied in other specific forms without departing from the spirit or essential attributes of the invention. For example, the voltage supplied to relay 58 may be taken from all or any portion of secondary winding 22. Similarly, any number of storage capacitors may be utilized depending upon the parameters of the circuitry and the values of the individual components. In addition, the present invention could be practiced without electrically connecting the relay circuitry to the motor driving circuitry. Also, as stated above, relay 58 could be replaced by solid-state circuitry. Furthermore, numerous other changes within the scope of the instant invention could be made by one skilled in the art.

I claim:

1. Circuitry for driving a reversible motor comprising first circuit means for driving said reversible motor in a first direction, second circuit means for driving said reversible motor in a direction opposite to said first direction, switching means for switching from said first circuit means to said second circuit means, electronic means for actuating said switching means, capacitor storage means connected to said switching means, means for applying current to said motor through said first circuit means while simultaneously applying current to said electronic means and to said capacitor storage means to energize said electronic means and to charge said capacitor storage means, means to actuate said switching means upon a deenergization of said electronic means caused by a loss of power to said circuitry whereby the energy contained within said capacitor storage means is applied to said second circuit means to drive said reversible motor in said opposite direction.

2. Circuitry in accordance with claim 1 further including first limit switch means within said first circuit means to disconnect said motor from said first circuit means when said motor is driven to a first predetermined position in said first direction and second limit switch means within said second circuit means to disconnect said motor from said second circuit means when said motor is driven to a second predetermined position in said opposite direction.

3. Circuitry in accordance with claim 1 further including an alternating current power source connected to a primary winding of a transformer, means connecting the secondary winding of said transformer to said first and second circuit means, said last mentioned means comprising first rectifier means connected to a first terminal of said secondary winding and second rectifier means connected to a second terminal of said secondary winding.

4. Circuitry in accordance with claim 1 wherein said capacitor storage means comprises a plurality of capacitors.

5. Circuitry in accordance with claim 3 including surge limiting resistance means connected between said first and second rectifier means and said energy storage means.

6. Circuitry in accordance with claim 1 wherein said switching means comprises two movable switching members whereby the energization or deenergization of said electronic means causes the simultaneous movement of said switching members in the same direction.

7. Circuitry in accordance with claim 3 further including resistor means connecting said electronic means to a center tap of said secondary winding.

8. Circuitry in accordance with claim 3 further including third and fourth rectifier means, means directly connecting said first rectifier means to said second rectifier means, means directly connecting said second rectifier means to said third rectifier means, means directly connecting said third rectifier means to said fourth rectifier means, and means directly connecting said fourth rectifier means to said first rectifier means.

9. A valve actuator comprising a reversible motor, means for driving said reversible motor, said driving means comprising first circuit means for driving said reversible motor in a first direction, second circuit means for driving said reversible motor in a direction opposite to said first direction, switching means for switching from said first circuit means to said second circuit means, electronic means for actuating said switching means, capacitor storage means connected to said switching means, means for applying current to said motor through said first circuit means while simultaneously applying current to said electronic means and to said capacitor storage means to energize said electronic means and to charge said capacitor storage means, first limit switch means within said first circuit means to disconnect said reversible motor from said first circuit means when said reversible motor is driven to a first predetermined position in said first direction, second limit switch means within said second circuit means to disconnect said motor from said second circuit means when said motor is driven to a second predetermined position in said opposite direction, means to actuate said switching means upon a deenergization of said electronic means caused by a loss of power to said driving means whereby the energy contained within said capacitor storage means is applied to said second circuit means to drive said reversible motor in said opposite direction.

10. A valve actuator in accordance with claim 9 further including an alternating current power source connected to a primary winding of a transformer, means connecting the secondary winding of said transformer to said first and second circuit means, said last mentioned means comprising first rectifier means connected to a first terminal of said secondary winding and second rectifier means connected to a second terminal of said secondary winding.

11. A valve actuator in accordance with claim 10 further including third and fourth rectifier means, means directly connecting said first rectifier means to said second rectifier means, means directly connecting said second rectifier means to said third rectifier means, means directly connecting said third rectifier means to said fourth rectifier means, and means directly connecting said fourth rectifier means to said first rectifier means.